United States Patent
Yeh

(10) Patent No.: US 8,830,192 B2
(45) Date of Patent: Sep. 9, 2014

(54) COMPUTING DEVICE FOR PERFORMING FUNCTIONS OF MULTI-TOUCH FINGER GESTURE AND METHOD OF THE SAME

(75) Inventor: Joe Tsung-Ying Yeh, Hsinchu (TW)

(73) Assignee: Elan Microelectronics Corporation, Hsinchu (TW)

( * ) Notice: Subject to any disclaimer, the term of this patent is extended or adjusted under 35 U.S.C. 154(b) by 250 days.

(21) Appl. No.: 13/349,831

(22) Filed: Jan. 13, 2012

(65) Prior Publication Data

US 2012/0182322 A1 Jul. 19, 2012

Related U.S. Application Data

(60) Provisional application No. 61/432,302, filed on Jan. 13, 2011.

(51) Int. Cl.
G06F 3/041 (2006.01)
G06F 3/0488 (2013.01)

(52) U.S. Cl.
CPC .................................. G06F 3/04883 (2013.01)
USPC .......................................... 345/173; 345/156

(58) Field of Classification Search
CPC .............................. G06F 3/042; G06F 3/0421
USPC ................................................... 345/173–179
See application file for complete search history.

(56) References Cited

U.S. PATENT DOCUMENTS

| | | | |
|---|---|---|---|
| 8,049,732 B2 * | 11/2011 | Hotelling et al. | 345/173 |
| 2005/0046621 A1 * | 3/2005 | Kaikuranta | 345/173 |
| 2008/0158178 A1 * | 7/2008 | Hotelling et al. | 345/173 |
| 2009/0128516 A1 * | 5/2009 | Rimon et al. | 345/174 |
| 2009/0243998 A1 * | 10/2009 | Wang | 345/156 |
| 2009/0251434 A1 * | 10/2009 | Rimon et al. | 345/173 |
| 2009/0309847 A1 * | 12/2009 | Russell et al. | 345/173 |
| 2010/0053111 A1 * | 3/2010 | Karlsson | 345/174 |
| 2010/0149114 A1 * | 6/2010 | Li | 345/173 |
| 2010/0259368 A1 * | 10/2010 | Fahn | 340/384.1 |
| 2010/0283748 A1 * | 11/2010 | Hsieh et al. | 345/173 |
| 2011/0007021 A1 * | 1/2011 | Bernstein et al. | 345/174 |
| 2011/0102464 A1 * | 5/2011 | Godavari | 345/650 |

FOREIGN PATENT DOCUMENTS

TW M347623 U 12/2008
TW 200939080 A 9/2009

OTHER PUBLICATIONS

Taiwanese Examination Report dated Mar. 10, 2014, directed to application No. 101101396, 13 pages.

* cited by examiner

*Primary Examiner* — Van Chow
(74) *Attorney, Agent, or Firm* — Smith Moore Leatherwood LLP

(57) ABSTRACT

A computing device for performing functions of multi-touch finger gesture is disclosed. The computing device includes a receiver to receive at least one of a first input from a first object or a second input from at least two second objects, a look-up-table (LUT) module to store a second set of functions associated with the at least two second objects, and a mapping module to map one type of the first input from the first object to a corresponding one of the second set of functions. The computing device is configured to perform a corresponding one of the second set of functions based on the type of the first input.

20 Claims, 8 Drawing Sheets

US 8,830,192 B2

COMPUTING DEVICE FOR PERFORMING FUNCTIONS OF MULTI-TOUCH FINGER GESTURE AND METHOD OF THE SAME

BACKGROUND OF THE INVENTION

The invention generally relates to a computing device and, more particularly, to a computing device for performing functions of multi-touch finger gesture through a touch pen.

A touch panel, via which a user may input messages or instructions by a touch pen or his/her fingers without the aid of a keyboard, has provided a friendly user interface. Furthermore, thanks to the absence of the keyboard, a computing device with such a touch panel may have a more compact size and enhanced portability. With the advantages of portability and friendly user interface, such computing devices, for example, smart phone, tablet computer and personal digital assistant (PDA) have become main stream in the information technology (IT) product market. When operating such computing devices, the user must use at least two fingers to perform most of the functions (i.e. functions of multi-touch finger gesture) such as zooming-in or zooming-out pictures on the touch panel. However, if the user tends to perform traditional functions (i.e., functions of single-touch), he/she has to use a traditional touch pen instead of a single finger, that may cause great inconvenience.

It is therefore desirable to have a computing device with a touch panel that is able to use a traditional touch pen to perform both functions of single-touch and functions of multi-touch finger gesture.

BRIEF SUMMARY OF THE INVENTION

Examples of the present invention may provide a computing device for performing functions of multi-touch finger gesture. The computing device includes a receiver to receive at least one of a first input from a first object or a second input from at least two second objects, a look-up-table (LUT) module to store a second set of functions associated with the at least two second objects, and a mapping module to map one type of the first input from the first object to a corresponding one of the second set of functions. The computing device is configured to perform a corresponding one of the second set of functions based on the type of the first input.

Some examples of the present invention may also provide a method for performing functions of multi-touch finger gesture in a computing device. The method comprises receiving a first input from a first object on a receiver of the computing device, identifying whether the type of the first input matches one of predetermined types, determining a corresponding multi-touch finger gesture if the type of the first input matches one of the predetermined types, and performing a corresponding function associated with the multi-touch finger gesture.

Other examples of the present invention may still provide a method for performing functions of multi-touch finger gesture in a computing device. The method comprises detecting a first input from a first object on a receiver of the computing device, identifying whether the type of the first input corresponds to one of predetermined types, and performing a corresponding function to the one of the predetermined types if the type of the first input corresponds to one of predetermined types, wherein the function corresponds to one of multi-touch finger gestures configured in the computing device.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The following detailed description of the invention will be better understood when read in conjunction with the appended drawings. For the purpose of illustrating the invention, examples are shown in the drawings. It should be understood, however, that the invention is not limited to the precise arrangements and instrumentalities shown in the examples.

In the drawings.

DETAILED DESCRIPTION OF THE INVENTION

Reference will now be made in detail to the present examples of the invention, examples of which are illustrated in the accompanying drawings. Wherever possible, the same reference numbers will be used throughout the drawings to refer to the same or like parts.

Figure 1:
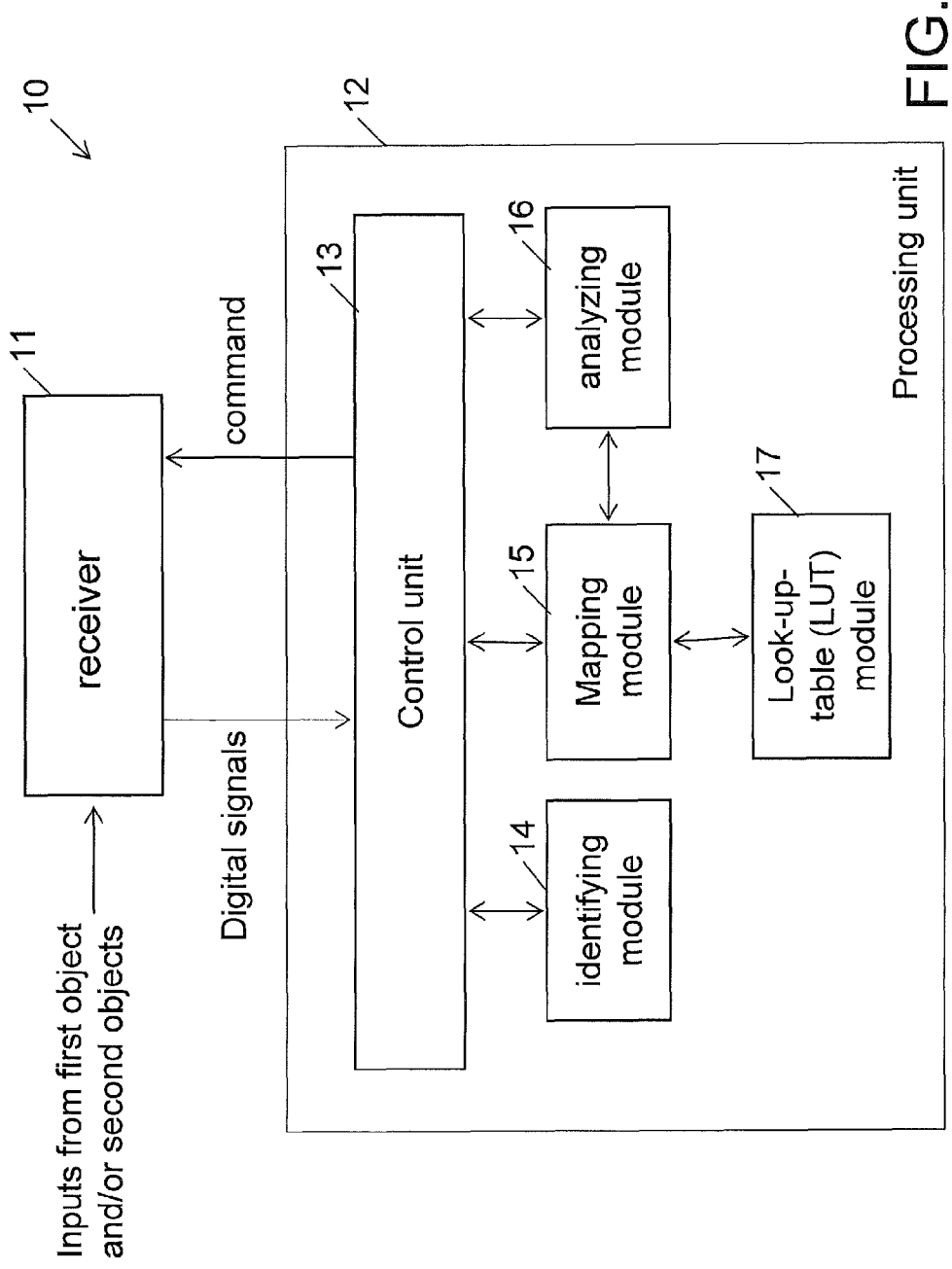
FIG. 1 is a block diagram of a computing device for performing functions associated with multi-touch finger gesture using a touch pen in accordance with an example of the present invention.

FIG. 1 is a block diagram of a computing device 10 for performing functions associated with multi-touch finger gesture using a touch pen in accordance with an example of the present invention. Referring to FIG. 1, the computing device 10 may include a receiver 11 and a processing unit 12 electrically coupled to each other.

The receiver 11 may receive first inputs from a first object and/or second inputs from at least two second objects. In one example of the present invention, the receiver 11 may include a touch panel of a personal digital assistant (PDA), a smart phone (such as I-Phone) or a tablet computer (such as I-Pad), wherein the touch panel may serve as a receiver 11 to receive the inputs from a user by means of the first and/or second objects and further serve as a display to show pictures or text.

In another example of the present invention, the receiver 11 may include a touch pad of a laptop computer, which is disposed under the keyboard and may merely function to receive the inputs from the user.

Furthermore, the first object may exemplarily include a touch pen that applies pressure on or voltage to the receiver 11 and thereby apply first inputs to the receiver 11. The second objects may each exemplarily include a finger of the user, which, when contact the receiver 11, apply second inputs to the receiver 11. Moreover, the first inputs of the first object may exemplarily include tracks or motions of the touch pen, and the second inputs of the at least two second objects may exemplarily include multi-touch finger gesture of the at least two fingers.

The receiver 11 may convert the received first and/or second inputs into digital signals and send the digital signals to the processing unit 12. The processing unit 12, which may be configured to process the digital signals, may thereafter send a corresponding command to the receiver 11 in response to the digital signals and thereby instruct the receiver 11 to perform a corresponding function.

The processing unit 12 may include an identifying module 14, a look-up-table (LUT) module 17, a mapping module 15, an analyzing module 16 and a control unit 13 configured to process the digital signals from the receiver 11.

Specifically, the identifying module 14 may be configured to identify which of the first object or the second objects or both that apply inputs to the receiver 11.

The LUT module 17 may be configured to store a first set of functions associated with the first object and a second set of functions associated with the second objects. In particular, one of the first set of functions may be associated with one corresponding type of the first inputs of the first object and one of the second set of functions may be associated with one corresponding type of the second inputs of the second objects. Furthermore, one of the second set of functions may be further mapped to one corresponding type of the first inputs of the first object. Accordingly, the mapping module 15 may be configured to map each type of the first inputs to a corresponding one of the second set of functions. Moreover, the analyzing module 16 may be configured to analyze the first input from the first object to identify whether the type of the first input maps to anyone of the second set of functions. If mapped, the computing device 10 may perform a mapped one of the second set of functions associated with the type of the first input. Thereby, the computing device 10 performs the second set of functions by means of the first object and in response to the first input from the first object.

In operation, if only the first object is identified, the computing device 10 may operate in one of a first mode and a second mode associated with the first object. Specifically, the computing device 10 may, in response to the first inputs of the first object, perform the first set of functions in the first mode or the second set of functions in the second mode.

Furthermore, if only the second objects are identified, the computing device 10 may operate in a third mode associated with the second objects. The computing device 10 may perform the second set of functions in the third mode in response to the second inputs of the second objects.

Moreover, if both the first and second objects are identified, the control module 13 may accept the first inputs of the first object and ignore the second inputs from the second objects. Subsequently, the computing device 10 operates in the first or the second mode associated with the first object.

Since the first object has a higher priority than the second objects, even if the computing device 10 is operating in the third mode to perform the second set of functions associated with the second objects, the control unit 13 may switch the computing device 10 to operate in the first or second mode when the first object is identified. Detailed operation of the computing device 10 will be discussed later in the following paragraphs by reference to FIGS. 2A to 4C.

Figure 2A:
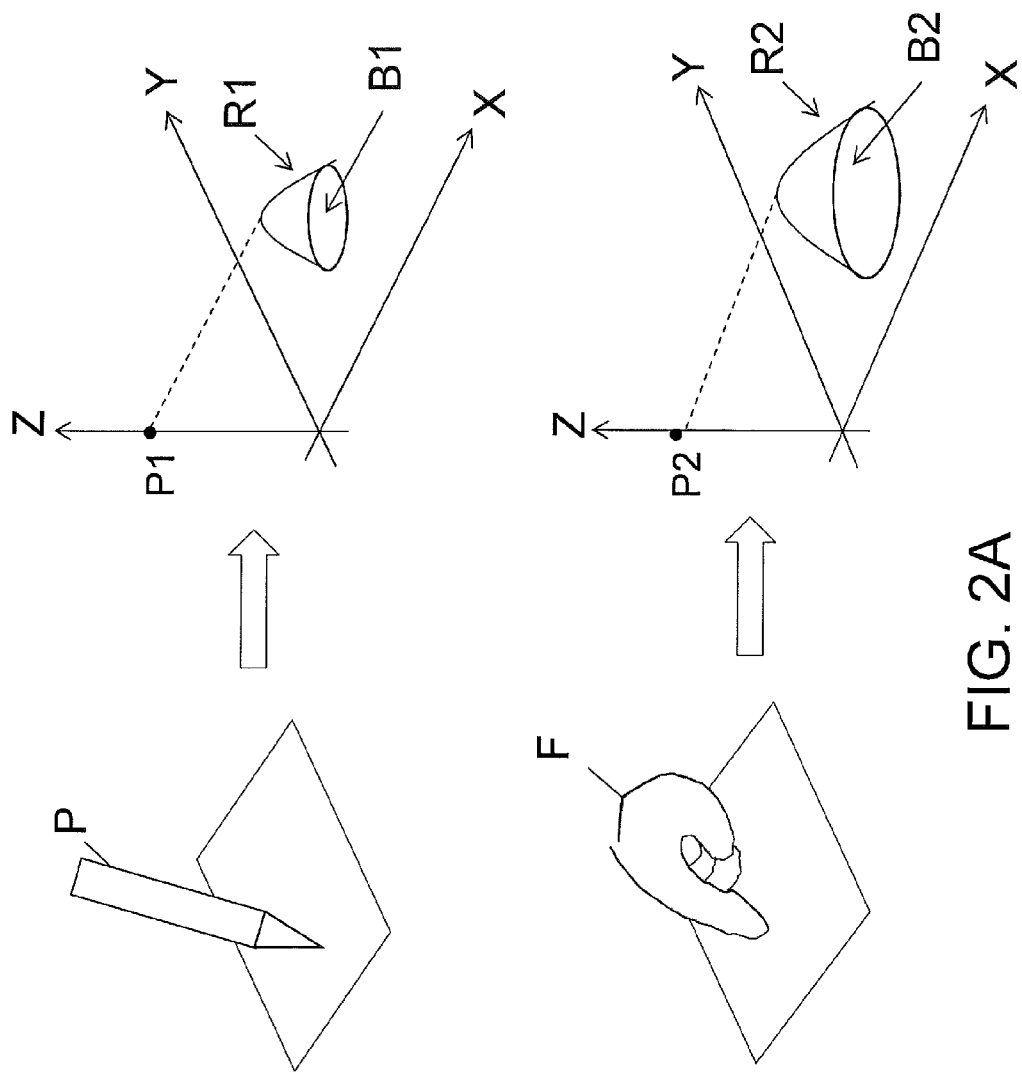
FIGS. 2A to 2C are schematic diagrams illustrating the scenarios of identifying a touch pen or fingers of a user in accordance with examples of the present invention.
Figure 2B:
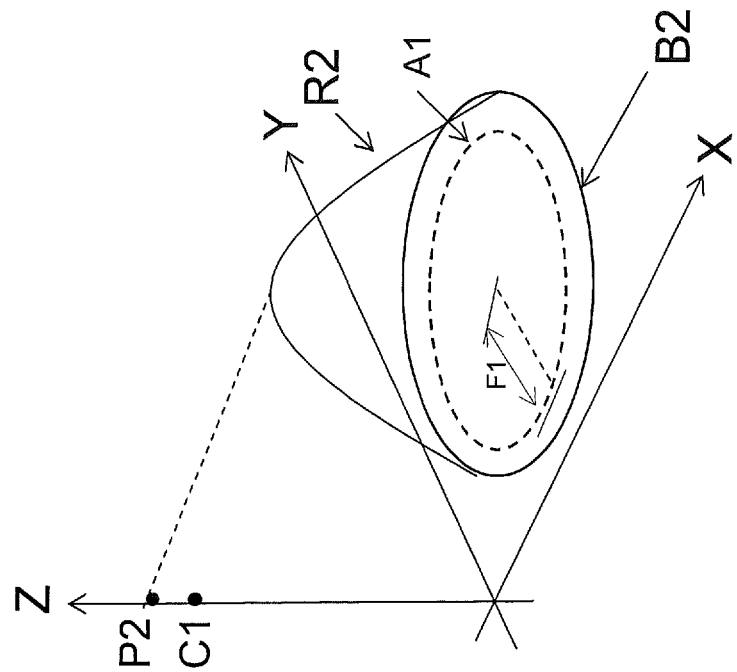
Figure 2B:
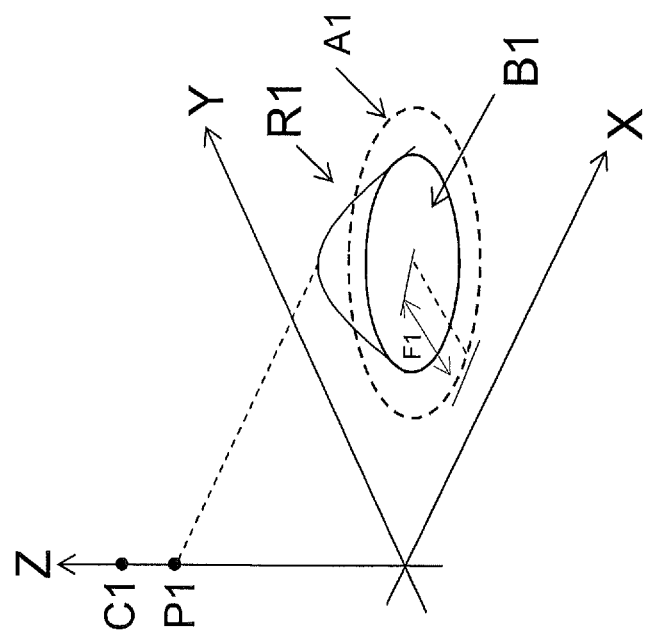
Figure 2C:
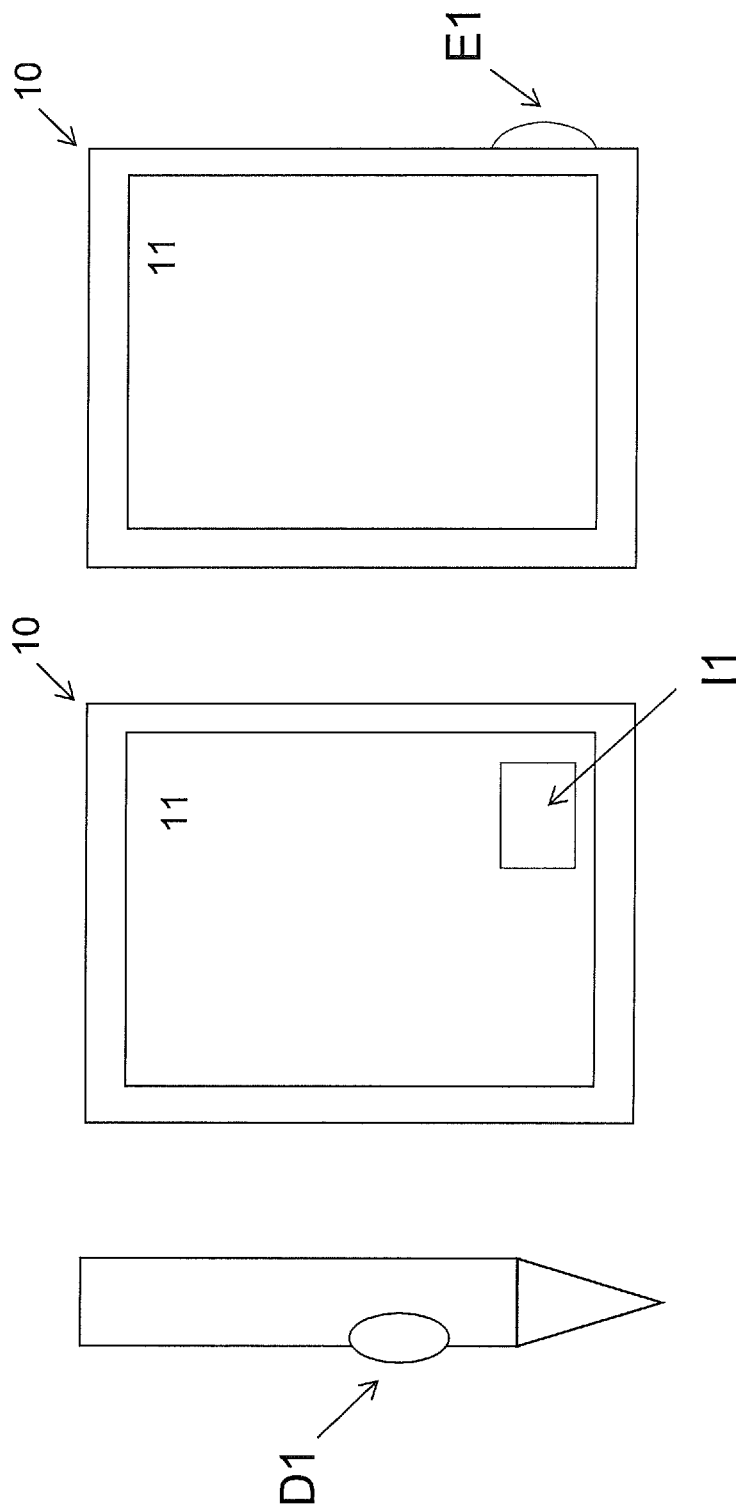

FIGS. 2A to 2C are schematic diagrams illustrating the scenarios of identifying a touch pen or fingers of the user in accordance with examples of the present invention. Referring to FIG. 2A, when the first object (i.e. the touch pen "P") or the second objects (i.e. the fingers "F" of the user) apply inputs on the receiver 11, responses R1 and R2 may be stimulated, respectively. The responses R1 and R2 may correspond to induced capacitances, which can be detected or observed on the receiver 11. Specifically, the profile of each of the responses R1 and R2 may take a three-dimensional form. For example, the profile may be represented by a bottom region defined in the "X" and "Y" axes in parallel with the plane surface of the receiver 11, and a height defined in the "Z" axis perpendicular to the bottom region. In the present example, the profiles of the responses R1 and R2 have bottom regions B1 and B2, respectively. Moreover, the areas of the bottom regions B1 and B2 may correspond to the scopes of the responses R1 and R2, respectively. Furthermore, the peak values P1 and P2 of the profiles, which are observed on the axis "Z", may correspond to the intensities of the responses R1 and R2, respectively. The identifying module 14 may be configured to calculate the areas of the bottom regions B1 and B2 or the peak values P1 and P2 of the profiles of the response R1 and R2. Information on the size of the profile may be used to determine the source, i.e., a touch pen, fingers or both, that an input associated with the profile may come from. The criteria by which the identifying module 14 is used to identify a touch pen or fingers will be discussed below by reference to FIG. 2B.

Referring to FIG. 2B, generally, the cross-sectional area of the tip of the touch pen is usually smaller than that of a finger of the user. Therefore, the bottom region B1 of the profile of the response R1 stimulated by the touch pen may have an area less than a predefined value A1 or a diameter less than a predefined value F1. Thus, an input having a profile with a size smaller than A1 or F1 may be identified as one from a touch pen. On the contrary, the bottom region B2 of the profile of the response R2 stimulated by the finger of the user may have an area greater than the predefined value A1 or a diameter greater than the predefined value F1. Thus, an input having a profile with a size greater than A1 or F1 may be identified as one from the fingers of the user.

On the other hand, the touch pen usually induces less capacitance than the finger of the user. Therefore, the peak value P1 of the profile of the response R1 stimulated by the touch pen may be less than a predefined value C1. Thus, an input having a profile with a peak value or height smaller than C1 may be identified as one from a touch pen. On the contrary, the peak value P2 of the profile of the response R2 stimulated by the finger may be greater than the predefined value C1. Thus, an input having a profile with a peak value or height greater than C1 may be identified as one from the finger of the user.

Referring to FIG. 2C, a user may inform the computing device 10 that a touch pen mode or finger mode is selected. For example, the user may select a desired mode by pressing a predefined button D1 on the touch pen, clicking a predefined icon I1 on the receiver 11 or pressing a predefined button E1 on the computing device 10.

Figure 3:
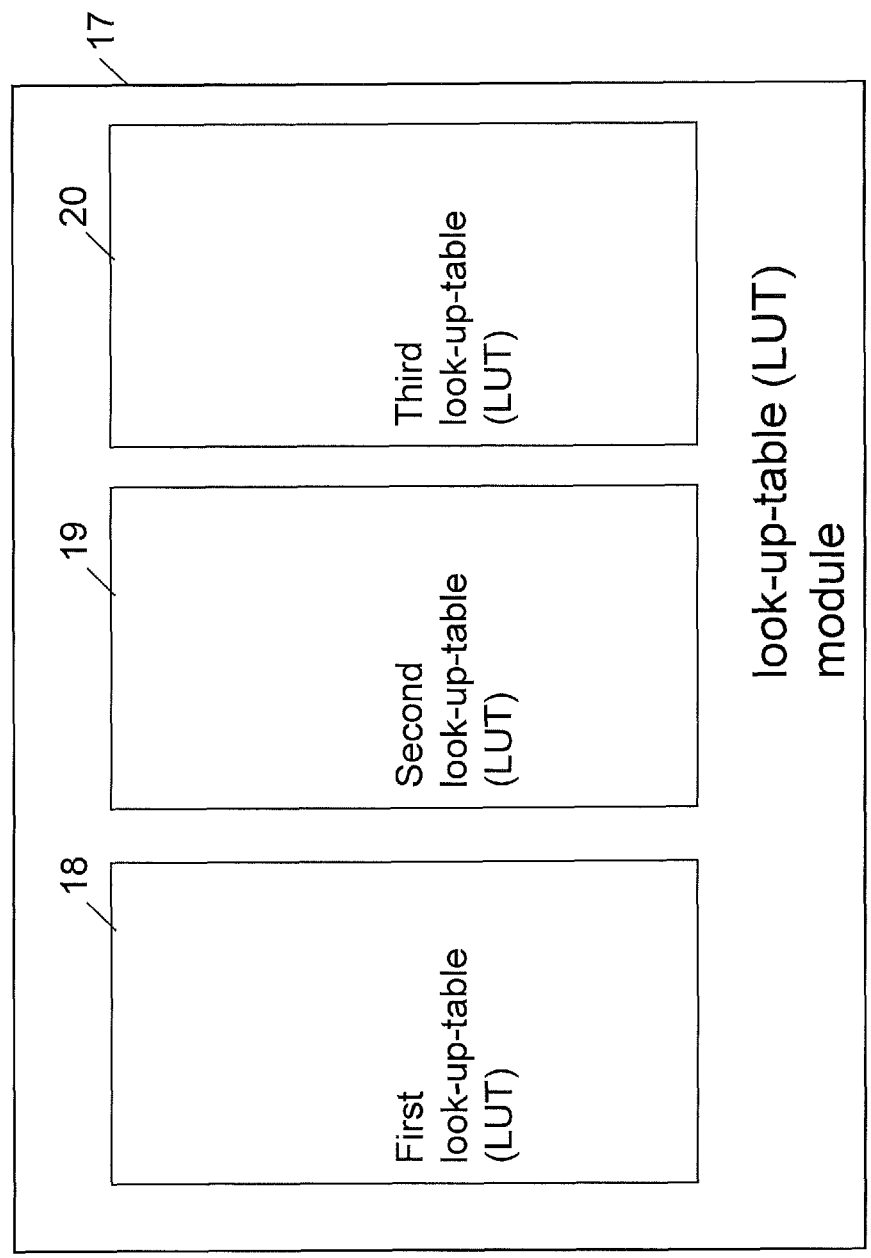
FIG. 3 is a block diagram of a look-up-table (LUT) module in accordance with an example of the present invention.

FIG. 3 is a block diagram of the look-up-table (LUT) module 17 in accordance with an example of the present invention. Referring to FIG. 3, the LUT module 17 may include a first LUT 18, a second LUT 19 and a third LUT 20. Specifically, the first LUT 18 may store the first set of functions associated with the first object, wherein one of the first set of functions may be associated with one corresponding type of the inputs of the first object. In one example of the present invention, the first object may include a touch pen and each one of the first set of functions may be associated with one corresponding type of the track or motion of the touch pen, which are listed in Table 1:

TABLE 1

| First Types of the tracks or motions of the touch pen | The first set of functions associated with the touch pen |
|---|---|
| Short click | Select |
| Long click | Copy/paste/popped-out window |
| symbols associated with letters | inputting a letter of texts |

When the computing device 10 operates in the first mode, the computing device 10 may perform a corresponding one of the first set of functions as listed in the second column of Table 1, which is associated with the type of the track or motion of the touch pen as listed in the first column of Table 1. For example, if the receiver 11 receives a short-click from the touch pen, the computing device 10 may perform a corresponding function whereby a specific item is selected. Moreover, if the receiver 11 receives a long-click from the touch pen, the computing device 10 may perform another corresponding function whereby the contents in a specific item are copied and temporarily stored in a memory of the computing device 10.

Furthermore, the second LUT 19 may store the second set of functions associated with the second objects, wherein each one of the second set of functions may be associated with the input of one corresponding type of the second objects. In one example of the present invention, the second objects may include at least two fingers of the user and each one of the second set of functions may be associated with one type of the multi-touch finger gesture, which are listed in the second and third columns of Table 2:

TABLE 2

| Second Types of the tracks or motions of the touch pen | Types of the multi-touch finger gesture | The second set of functions associated with the at least two fingers |
|---|---|---|
| Motion: Circle clockwise or counter-clockwise | Moving two fingers in clockwise or counter-clockwise direction | Rotate |
| Track: "<" | Moving two fingers apart | Zoom in |
| Track: ">" | Moving two fingers together | Zoom out |
| Motion: Tap once | Two fingers tap once | Double tap |
| Track: "^" | Three fingers move up | Switch App window |
| Track: "v" | Three fingers move down | Jump to "My computer" |
| Motion: Move in an arbitrary direction | Two fingers move in an arbitrary direction | Scroll |
| Motion: Tap twice | One finger is stationary while another finger taps | Magnifier |
| Motion: Sweep to left or sweep to right | Three fingers move left or right | Page forward/back |
| Track: "x" | Four fingers move down | View desktop |

When the computing device 10 operates in the third mode in which the user applies inputs (applies inputs on the receiver 11 of the computing device 10) with fingers, the computing device 10 may perform a corresponding one of the second set of functions as listed in the third column of Table 2, which is associated with the type of the multi-touch gesture, as listed in the second column of Table 2. For example, if the receiver 11 receives a multi-touch finger gesture of "moving two fingers apart" (i.e., the distance between two fingers becomes longer), the computing device 10 may perform a corresponding function whereby pictures currently displayed on the computing device 10 may be zoomed in. Moreover, if the receiver 11 receives a multi-touch finger gesture of "moving two fingers together" (i.e., the distance between two fingers becomes shorter), the computing device 10 may perform a corresponding function whereby pictures currently displayed on the computing device 10 may be zoomed out.

The second LUT 19 may further store a set of types of the tracks or motions of the touch pen (i.e., the gestures of the touch pen) as listed in the first column of Table 2. The gestures of the touch pen as listed in the first column of Table 2, the multi-touch finger gestures as listed in the second column of Table 2 and the second set of functions as listed in the third column of Table 2 correspond to one another in the row direction. When the computing device 10 operates in the second mode, if the track or motion of the touch pen matches one of the types as listed in the first column (of Table 2), the computing device 10 may identify a corresponding type of the multi-touch finger gestures that corresponds to the type of the input (i.e., the track or motion) of the touch pen. Thereafter, the computing device 10 may perform a corresponding function to the type of the multi-touch finger gesture. For example, if the receiver 11 receives a track of "<" of the touch pen, the computing device 10 may firstly identify which type of multi-touch finger gestures that the track of "<" corresponds to. That is, the computing device 10 may identify that the track of "<" corresponds to the type of multi-touch finger gesture: "moving two finger apart". Then, the computing device 10 performs a corresponding function to the multi-touch finger gesture: "moving two finger apart", by which the pictures displayed on the computing device 10 may be zoomed in. However, if the receiver 11 receives a wrong or an undefined track or motion of the touch pen, the computing device 10 may not perform any function.

Moreover, the third LUT 20 (shown as Table 3) may be similar to the second LUT 19 (shown as Table 2). However, the methods provided in Table 2 and Table 3 are different. Specifically, Table 2 provides a method by which the computing device 10 firstly identifies which type of multi-touch finger gestures that the input of the touch pen corresponds to, then the computing device 10 performs a corresponding function that corresponds to the type of the multi-touch finger gesture. On the other hand, Table 3 provides a method by which the computing device 10 directly identifies which one of functions as listed in the second column of Table 3 (the functions as listed in column 2 of Table 3 are the second set of functions associated with the at least two fingers, i.e., corresponding functions to the multi-touch finger gestures) that the second type of the input of the touch pen corresponds to. In the method provided by Table 3, the computing device 10 does not need to identify which type of multi-touch finger gestures that the input of the touch pen corresponds to.

TABLE 3

| Second Types of the tracks or motions of the touch pen | The second set of functions associated with the at least two fingers |
|---|---|
| Motion: Circle clockwise or counter-clockwise | Rotate |
| Track: "<" | Zoom in |
| Track: ">" | Zoom out |
| Motion: Tap once | Double tap |
| Track: "^" | Switch App window |
| Track: "v" | Jump to "My computer" |
| Motion: Move in an arbitrary direction | Scroll |
| Motion: | Magnifier |

TABLE 3-continued

| Second Types of the tracks or motions of the touch pen | The second set of functions associated with the at least two fingers |
| --- | --- |
| Tap twice Motion: Sweep to left or sweep to right | Page forward/back |
| Track: "x" | View desktop |

In Table 3, the second types of the tracks or motions of the touch pen correspond to the second set of functions associated with the at least two fingers. In other words, the functions to which the second types of the inputs of the touch pen correspond also correspond to the multi-touch finger gestures. When the computing device 10 operates in the second mode, if the computing device 10 identifies that the input of the touch pen matches one of the second types as listed in the first column of Table 3, the computing device 10 performs a corresponding one of the second set of functions as listed in the second column of Table 3. For example, if the receiver 11 receives a clockwise track of the touch pen, the computing device 10 may perform a corresponding function whereby the pictures displayed on the computing device 10 may be rotated. However, if the receiver 11 receives a wrong or an undefined track or motion of the touch pen, the computing device 10 may not perform any function.

The operating scenario of the computing device 10 by which the computing device 10 may be switched among the first, the second and the third modes and perform a corresponding one of the first or the second set of functions as listed in Tables 1, 2 and 3 will be discussed in the following paragraphs by reference to FIGS. 4A to 4C.

Figure 4A:
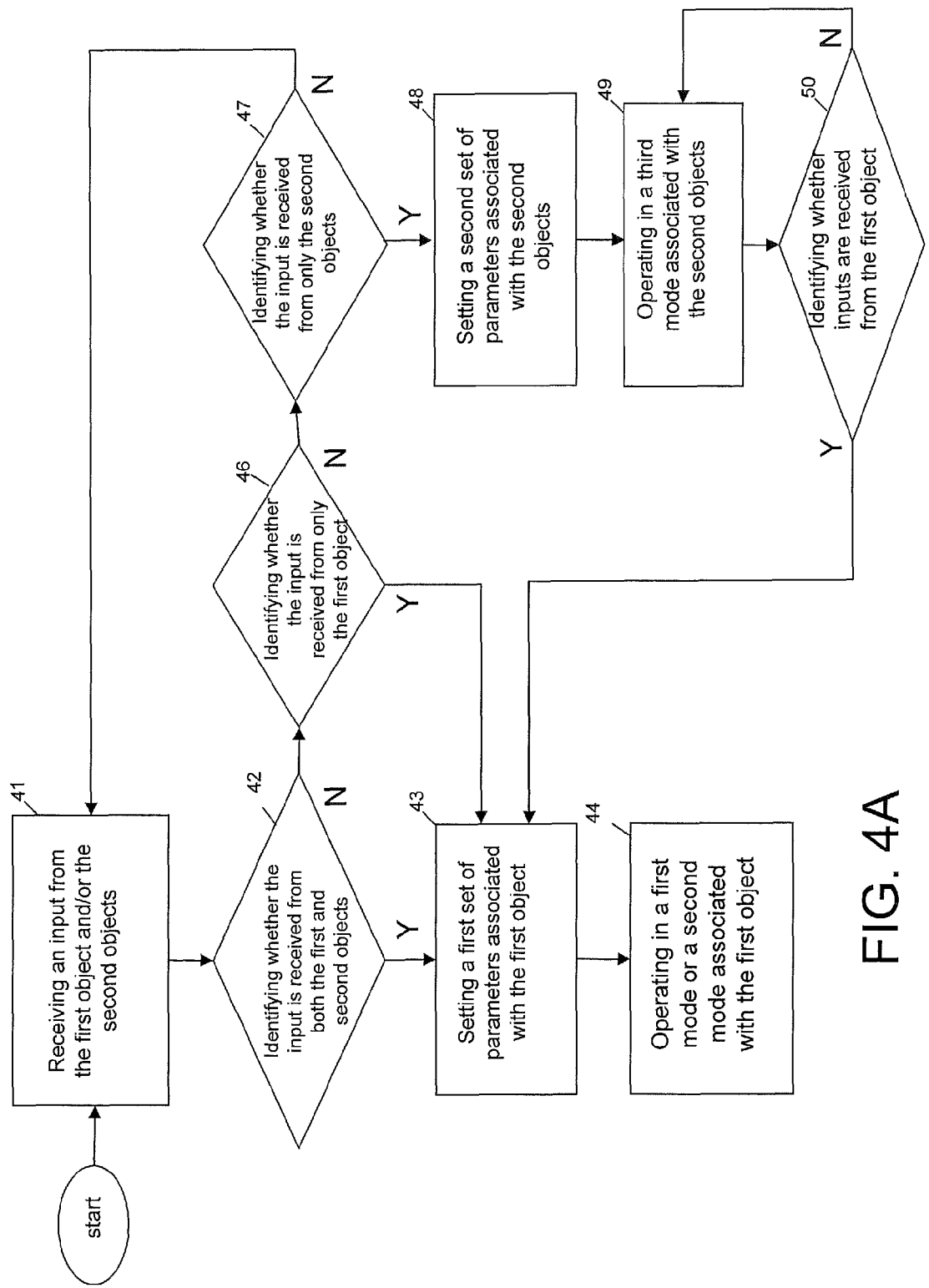
FIGS. 4A and 4B are flow diagrams illustrating a method of performing multi-touch gesture through a touch pen in accordance with an example of the present invention.
Figure 4B:
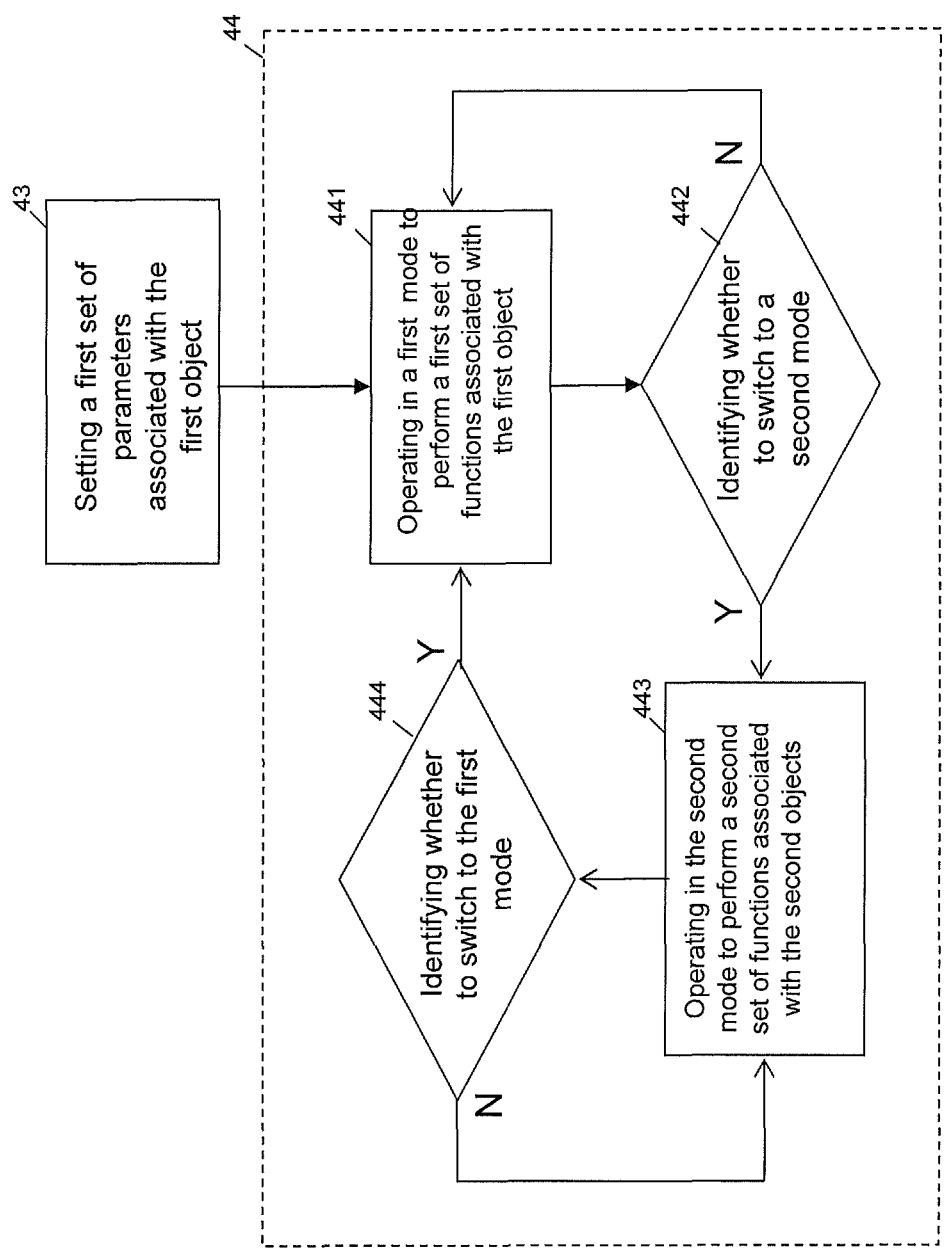
Figure 4C:
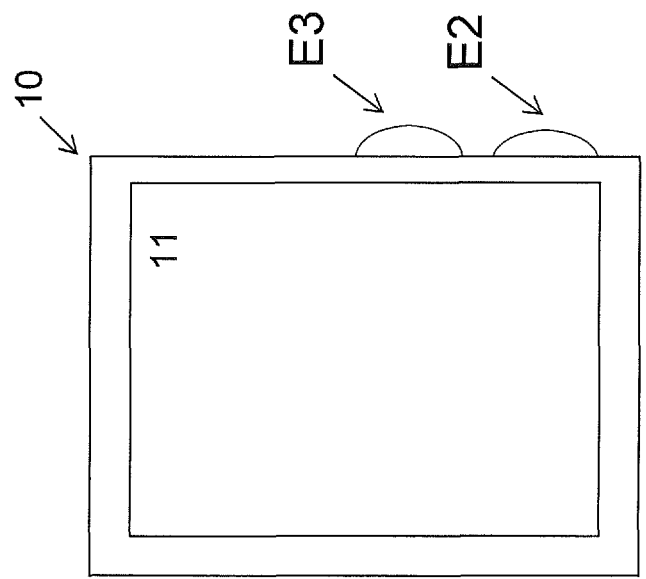
FIG. 4C is a schematic diagram illustrating the structure of a touch pen and a computing device associated with method illustrated in FIGS. 4A and 4B.
Figure 4C:
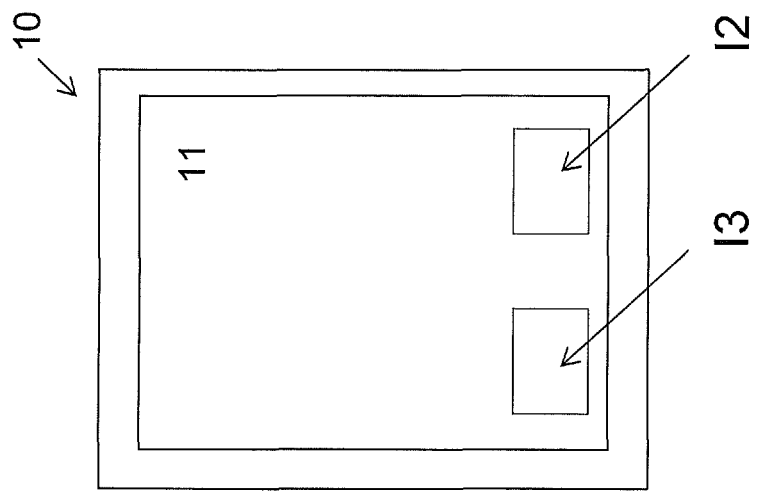
Figure 4C:
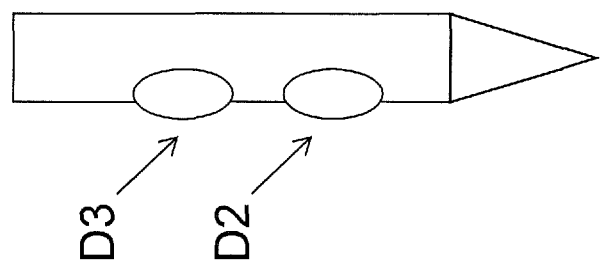

FIGS. 4A and 4B are flow diagrams illustrating a method of performing multi-touch gesture through a touch pen in accordance with an example of the present invention. It is assumed that the computing device 10 is initially set at standby state and the receiver 11 is ready for receiving an input. Referring to FIG. 4A, at step 41, the receiver 11 may receive an input from the first object (i.e. the touch pen) and/or the second objects (i.e. the fingers of the user).

Next, at step 42, the identifying module 14 may identify whether the input on the receiver 11 are received from the touch pen and/or the fingers of the user.

If both the touch pen and the fingers of the user are identified, the input from the touch pen is accepted due to a higher priority. That is, the input from the touch pen may be processed by the processing unit 12 while the input from the fingers of the user may be ignored. Then, at step 43, a first set of parameters associated with the touch pen may be set up so as to facilitate the processing unit 12 to process the inputs from the touch pen. In one example of the present invention, the first set of parameters associated with the touch pen may include the sensitivity of the receiver 11 with respect to the touch pen, which may enhance the precision.

However, if the inputs on the receiver 11 are not from both the touch pen and the fingers of the user, at step 46, the identifying module 14 may identify whether the inputs on receiver 11 are from the touch pen. If confirmative, at step 43, the first set of parameters associated with the touch pen may be set up.

On the other hand, if the inputs on the receiver 11 are not from a touch pen, at step 47, the identifying module 14 may further identify whether the inputs on receiver 11 are from the fingers of the user. If confirmative, at step 48, a second set of parameters associated with the fingers may be set up so as to facilitate the processing unit 12 to process the inputs from the fingers of the user. Similar to the first set of parameters associated with the touch pen, the second set of parameters associated with the fingers may include the sensitivity of the receiver 11 with respect to the fingers that may enhance the precision.

Next, at step 49, the computing device 10 operates in the third mode associated with the fingers of the user. In the third mode, the computing device 10 may perform a corresponding one of the second set of functions associated with the at least two fingers, which maps to one type of the inputs (i.e. the multi-touch gestures) of the at least two fingers as listed in Table 2. When operating in the third mode associated with the inputs from the fingers, the receiver 11 may detect if there is any input from a touch pen. Subsequently, at step 50, if an input from a touch pen is identified, at step 43, the first set of parameters associated with the touch pen may be set up to facilitate the processing of the input from the touch pen. The processing unit 12 may bypass the subsequent inputs from the fingers of the user and process the inputs from a touch pen.

Next, at step 44, that is subsequent to step 43, the computing device 10 may operate in the first mode or the second mode associated with the touch pen. The detailed operation of the computing device 10 in the first mode and the second mode will be respectively discussed later in the following paragraphs by reference to FIGS. 4B and 4C.

Referring to FIG. 4B, at step 441, the computing device 10 may initially operate in the first mode to perform the first set of functions associated with a touch pen (as listed in Table 1).

Next, at step 442, the control unit 13 may identify whether a first switch event is triggered to switch the computing device 10 to operate in a second mode associated with a touch pen. The first switch event may be manually triggered by, for example, pressing a predefined button D2 on the touch pen, pressing a predefined button E2 on the computing device, or clicking a predefined icon 12 on the receiver 11 as shown in FIG. 4C. In another example, the first switch event may be automatically triggered when the first type of track or motion of the touch pen is identified. One skilled in this art would easily understand that, in still another example, it may be defined that the first switch event is triggered by a predefined track or input of the touch pen.

Referring back to FIG. 4B, if the first switch event is identified, at step 443, the computing device 10 is switched to operate in a second mode. However, if the first switch event is not triggered, the computing device 10 may remain in the first mode at step 441.

In another example, step 442 can be executed right after step 43 so as to identify in which one of the first mode and the second mode that the computing device 10 operates.

The computing device 10 operates in the second mode at step 443. The operations of the computing device 10 in the second mode may be performed based on Table 2, Table 3 and the relevant descriptions thereof.

Next, at step 444 which is similar to step 442, the control unit 13 may identify whether a second switch event is triggered to switch the computing device 10 back to operate in the first mode. Like the first switch event, the second switch event may be manually triggered by, for example, pressing the predefined button D2 or another predefined button D3 on the touch pen, pressing the predefined button E2 or another predefined button E3 on the computing device 10 or clicking the predefined icon 12 or another predefined icon 13 on the receiver 11 as shown in FIG. 4C. In another example, the second switch event may be automatically triggered when the second type of track or motion of the touch pen is identified. One skilled in this art would easily understand that, in still another example, it may be defined that the second switch event is triggered by a predefined track or input of the touch pen.

Referring back to FIG. 4B, if the second switch event is identified, at step 441, the computing device 10 may be switched back to operate in the first mode. However, if the second switch event is not triggered, the computing device 10 may remain in the second mode at step 443.

The example of the present invention provides a method by which functions corresponding to multi-touch finger gestures, which are configured or built in the computing device 10, can be executed by an input of a touch pen. From the above descriptions and the relevant drawings thereof, one skilled in this art would easily understand that the method of the present invention may be applied to a touch pad or a transparent touch panel. Furthermore, taking the touch pen as an example, a first set of functions may be executed in response to the input from the touch pen in a first mode. On the other hand, the touch pen may be simulated as multi-fingers to operate on the touch pad in a second mode and in turn execute a second set of functions. Two examples of operations in the second mode are respectively described in Table 2, Table 3 and the relevant descriptions thereof. In yet another example, it may not need to classify the operations of the touch pen as a first mode and a second mode. As an alternative, the operations of the computing device 10 may be merely classified as a touch-pen-mode and a finger-mode. In such a case, whether to execute the first set of functions or the second set of functions is identified based on the track of the touch pen.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

Further, in describing representative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

I claim:

1. A computing device for performing functions of multi-touch finger gesture, the computing device comprising:
   a receiver to receive at least one of a first input from a first object or a second input from at least two second objects wherein the first object includes a touch pen, the first input of the first object includes tracks or motions of the touch pen, the at least two second objects include at least two fingers, and the second input from the at least two second objects includes multi-touch finger gestures;
   a look-up-table (LUT) module to store a second set of functions associated with the at least two second objects; and
   a mapping module to map one type of the first input from the first object to a corresponding one of the second set of functions,
   wherein the computing device is configured to perform a corresponding one of the second set of functions based on the type of the first input, and each one of the second set of functions is associated with one type of the multi-touch finger gestures.

2. The computing device of claim 1, wherein the look-up-table (LUT) module further stores a first set of functions associated with the first object.

3. The computing device of claim 2 further comprising a control unit configured to switch the computing device to operate among a first mode, a second mode and a third mode.

4. The computing device of claim 3, wherein the computing device is configured to perform a corresponding one of the first set of functions based on the type of the first input in the first mode.

5. The computing device of claim 3, wherein the computing device is configured to perform a mapped one of the second set of functions based on the type of the first input in the second mode.

6. The computing device of claim 3, wherein the computing device is configured to perform a corresponding one of the second set of functions based on the type of the second input in the third mode.

7. The computing device of claim 3 further comprising an identifying module to identify the first and the second inputs, wherein the control unit is configured to switch the computing device to operate in one of the first and second modes if the first input is identified, and switch the computing device to operate in the third mode if only the second input is identified.

8. The computing device of claim 1, wherein the receiver comprises a touch pad or a transparent touch panel.

9. A method for performing functions of multi-touch finger gesture in a computing device, the method comprising:
   receiving a first input from a first object on a receiver of the computing device wherein the first object comprises a touch pen, and the first input of the first object comprises tracks or motions of the touch pen;
   identifying whether the type of the first input matches one of predetermined types wherein a first set of parameters associated with the touch pen are set up so as to facilitate a processing of the first input from the touch pen, and the first set of parameters include a sensitivity of the receiver with respect to the touch pen, which enhances a precision;
   determining a corresponding multi-touch finger gesture if the type of the first input matches one of the predetermined types; and
   performing a corresponding function associated with the multi-touch finger gesture.

10. The method of claim 9, wherein the receiver of the computing device comprises a touch panel.

11. The method of claim 9, wherein the receiver of the computing device comprises a touch pad.

12. The method of claim 9, wherein performing the function comprising rotating pictures currently displayed on the computing device, the multi-touch finger gesture including moving two fingers in clockwise or counter-clockwise direction across the receiver of the computing device.

13. The method of claim 9, wherein performing the function comprising zooming in pictures currently displayed on the computing device, the multi-touch finger gesture including moving two fingers apart.

14. The method of claim 9, wherein performing the function comprising zooming out pictures currently displayed on the computing device, the multi-touch finger gesture including moving two fingers together.

15. A method for performing functions of multi-touch finger gesture in a computing device, the method comprising:
   detecting a first input from a first object on a receiver of the computing device wherein the first object comprises a touch pen, and the first input of the first object comprises tracks or motions of the touch pen;
   identifying whether the type of the first input corresponds to one of predetermined types wherein a first set of parameters associated with the touch pen are set up so as to facilitate a processing of the first input from the touch pen, and the first set of parameters include a sensitivity of the receiver with respect to the touch pen which enhances a precision; and
   performing a corresponding function to the one of the predetermined types if the type of the first input corresponds to one of predetermined types,
   wherein the function corresponds to one of multi-touch finger gestures configured in the computing device.

16. The method of claim 15, wherein the receiver of the computing device comprises a touch panel.

17. The method of claim 15, wherein the receiver of the computing device comprises a touch pad.

18. The method of claim 15, wherein performing the function comprising rotating pictures currently displayed on the computing device, the multi-touch finger gesture including moving two fingers in clockwise or counter-clockwise direction across the receiver of the computing device.

19. The method of claim 15, wherein performing the function comprising zooming in pictures currently displayed on the computing device, the multi-touch finger gesture including moving two fingers apart.

20. The method of claim 15, wherein performing the function comprising zooming out pictures currently displayed on the computing device, the multi-touch finger gesture including moving two fingers together.

* * * * *